United States Patent
Reyman

(10) Patent No.: US 6,694,997 B2
(45) Date of Patent: *Feb. 24, 2004

(54) ENHANCED AND REMOTE METER READING WITH VIBRATION ACTUATED VALVE

(76) Inventor: Mark Reyman, 16 W. First St., Mt. Vernon, NY (US) 10550

( * ) Notice: Subject to any disclaimer, the term of this patent is extended or adjusted under 35 U.S.C. 154(b) by 0 days.

This patent is subject to a terminal disclaimer.

(21) Appl. No.: 10/197,234

(22) Filed: Jul. 16, 2002

(65) Prior Publication Data

US 2003/0079774 A1 May 1, 2003

Related U.S. Application Data

(60) Division of application No. 09/410,564, filed on Oct. 1, 1999, now Pat. No. 6,470,903, which is a continuation-in-part of application No. 09/072,896, filed on May 5, 1998, now Pat. No. 5,960,807.

(51) Int. Cl.$^7$ .............................................. F16K 17/36
(52) U.S. Cl. ................... 137/39; 137/460; 137/624.12
(58) Field of Search ................ 137/460, 39, 624.12, 137/10; 73/262, 263, 269

(56) References Cited

U.S. PATENT DOCUMENTS

| | | | |
|---|---|---|---|
| 3,407,827 A | 10/1968 | Follett | 137/39 |
| 4,098,284 A | 7/1978 | Yamada | 137/39 |
| 4,162,484 A | 7/1979 | Abe et al. | 340/150 |
| 4,167,194 A | 9/1979 | Matsuda | 137/38 |
| 4,263,928 A | 4/1981 | Kobayashi et al. | 137/39 |
| 4,315,523 A * | 2/1982 | Mahawili et al. | 137/486 |
| 4,349,042 A | 9/1982 | Shimizu | 137/39 |
| 4,414,994 A | 11/1983 | Hogan | 137/38 |
| 4,429,704 A | 2/1984 | Jones | 137/45 |
| 4,463,773 A | 8/1984 | Kojima et al. | 137/38 |
| 4,542,760 A | 9/1985 | Flauiani | 137/45 |
| 4,546,660 A | 10/1985 | Bujold | 74/2 |
| 4,550,744 A | 11/1985 | Igashira et al. | 137/80 |
| 4,742,839 A | 5/1988 | Stock | 1137/38 |
| 4,816,672 A | 3/1989 | Hughes | 250/231 |
| 4,821,759 A | 4/1989 | Diamond | 137/45 |
| 4,841,287 A | 6/1989 | Flig et al. | 340/690 |
| 4,852,600 A | 8/1989 | Asbra et al. | 137/38 |
| 4,860,780 A | 8/1989 | Fisher | 137/45 |
| 4,915,122 A | 4/1990 | Ikegaya et al. | 137/38 |
| 4,918,995 A | 4/1990 | Pearman et al. | 73/861 |
| 4,959,581 A | 9/1990 | Dantlgraber | 310/328 |
| 4,971,094 A | 11/1990 | Gonzalez | 137/38 |
| 4,972,872 A | 11/1990 | Hunt | 137/487.5 |
| 4,979,528 A | 12/1990 | Asbra et al. | 137/38 |
| 5,029,610 A | 7/1991 | Hiratsuka et al. | 137/557 |
| 5,038,820 A | 8/1991 | Ames et al. | 137/486 |
| 5,048,552 A | 9/1991 | Bourne | 137/39 |
| 5,228,469 A | 7/1993 | Otten et al. | 137/80 |
| 5,388,606 A | 2/1995 | Banks | 137/38 |
| 5,526,685 A * | 6/1996 | Davis | 73/262 |
| 5,687,758 A | 11/1997 | Schuster | 137/460 |
| 5,782,263 A * | 7/1998 | Isaacson et al. | 137/487.5 |
| 5,811,675 A | 9/1998 | Hamer | 73/198 |
| 5,868,162 A | 2/1999 | Dickerson | 137/557 |
| 5,960,807 A * | 10/1999 | Reyman | 137/1 |
| 6,023,223 A | 2/2000 | Baxter, Jr. | 340/531 |
| 6,470,903 B2 * | 10/2002 | Reyman | 137/1 |

FOREIGN PATENT DOCUMENTS

CA 1261394 9/1989

* cited by examiner

*Primary Examiner*—Stephen M. Hepperle
(74) *Attorney, Agent, or Firm*—Sofer & Haroun, LLP

(57) ABSTRACT

An automatically actuated regulation system for a natural gas pipeline having flow control unit, a vibration sensor, a gas flow meter, a trigger unit, and a microprocessor. The microprocessor actuates the flow control unit when two conditions are met. First, there must be a vibration which surpasses a predetermined threshold. Second, flow in the natural gas pipeline must have increased over the flow rate before the vibration. The system can be configured to store gas usage data and, in one embodiment, transmit the data to another location through the use of a modem or other communication means.

19 Claims, 6 Drawing Sheets

ENHANCED AND REMOTE METER READING WITH VIBRATION ACTUATED VALVE

CROSS REFERENCE TO RELATED APPLICATION

This application is a divisional application of U.S. patent application Ser. No. 09/410,564, filed Oct. 1, 1999, now U.S. Pat. No. 6,470,903 which is a continuation-in-part of application Ser. No. 09/072,896 now U.S. Pat. No. 5,960,807, filed May 5, 1998.

FIELD OF THE INVENTION

This invention relates to automatically actuated valves, and more particularly, to a system which is capable of automatically regulating the flow of natural gas in pipelines.

BACKGROUND OF THE INVENTION

Natural gas flows from municipal gas mains to customer locations. At a customer location, gas is routed through smaller pipes into a gas meter. Pipes then carry the gas into a customer residence or business where the gas is ultimately used by appliances or other gas-consuming devices. While gas mains are susceptible to rupture from the violent vibrations caused by earthquakes, the smaller pipes leading into a residence or business are often at higher risk of rupture. In the aftermath of an earthquake, the damage resulting from fires caused by gas pipe rupture can oftentimes exceed the damage resulting from shaking caused by the earthquake.

There are numerous prior art proposals for gas shut-off valves which are designed to respond to earthquakes. Such proposals typically cause false shut-offs in response to non-earthquake vibrations. Furthermore, the prior art shut-off systems proceed to shut-off the gas flow regardless of whether there is a rupture in the gas line. This can result in repeated loss of gas service. As a result, these prior art systems are rarely implemented on a wide scale.

Thus there is the need for a relatively simple, cost-effective system, which can reliably detect the rupture of natural gas pipelines due to earthquake vibration and, in turn, shut-off gas supply only when warranted.

SUMMARY OF THE INVENTION

In accordance with one embodiment of the invention, an automatically actuated regulation system for a natural gas pipeline comprises a flow control device, a vibration sensor, a gas flow meter, a trigger unit, and a microprocessor. The microprocessor prompts the flow control device to restrict the flow of gas when two conditions are preferably met. The first condition is met when the vibration sensor detects a vibration that surpasses a predetermined threshold value. The second condition is met when the flow rate in the natural gas pipeline has increased over the flow rate before the vibration. The microprocessor receives data from the vibration sensor and the flow meter. Comparisons are then made and the flow control unit is actuated when the conditions are met.

In another embodiment of the invention, an automatically actuated regulation system for gas and other fluids flowing in a pipeline incorporates a mechanical gas flow meter that provides a mechanical output signal corresponding to the measure of gas flow through the pipeline. Preferably, this is a diaphragm type meter provided by the utility company. The meter is coupled to a means for converting the mechanical output signal to an electrical output signal. In turn, the conversion means is coupled to a microprocessor that is configured to control the regulation system. As with the above embodiment, the system includes a flow control device, a vibration sensor, and a trigger unit. The microprocessor prompts the flow control device to restrict the flow of gas when two conditions are preferably met as described above.

In yet another embodiment of the invention, the system also comprises a modem that is capable of transmitting and receiving data over a communication line. Thus, data from the regulation system can be examined at locations other than the place where the system is situated.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, may be best understood by reference to the following detailed description when read with the accompanying drawings in which:

DETAILED DESCRIPTION OF THE PRESENTLY PREFERRED EMBODIMENT

Figure 1:
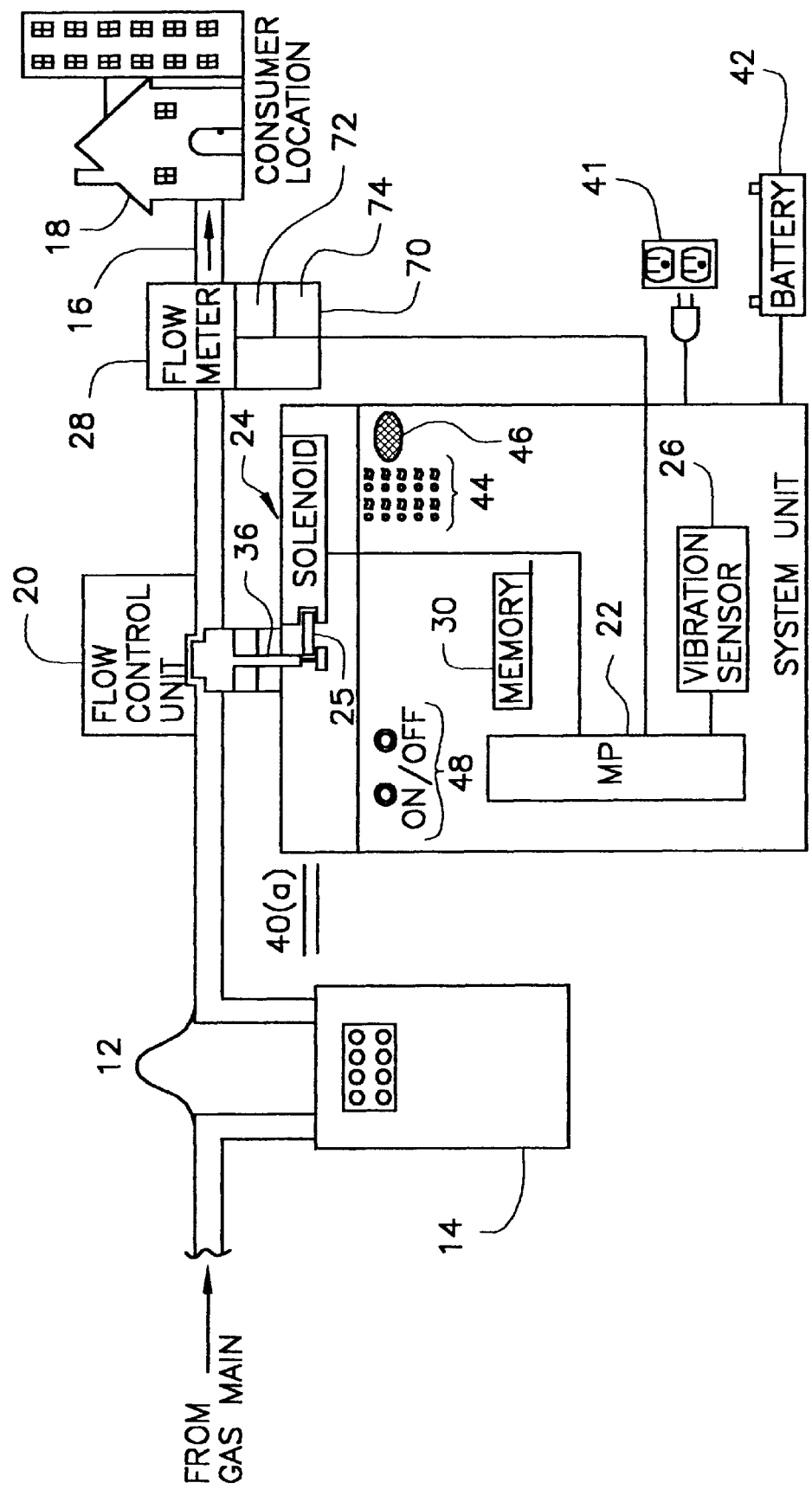
FIG. 1 is a block diagram of the basic components of a valve shutoff system in accordance with one embodiment of the present invention.

FIG. 1 illustrates, in block diagram form, an automatically actuated regulation system 40(*a*) for use with a natural gas pipeline 12 in accordance with one embodiment of the invention, although the invention is not limited in scope in that respect. For example system 40(*a*) may be employed to regulate the flow of other gaseous and fluid substances as will be appreciated by those skilled in the art.

Natural gas pipeline 12 is coupled to gas flow meter 14, which is configured to provide a measurement of gas flow for use by the gas supplier company. Gas pipeline 12 continues from an output port of gas meter 14. The flow of the gas in pipeline 12 on its way to different branches at consumer location 18 is then monitored by a flow meter 28 and controlled by regulation system 40(*a*) in accordance with one embodiment of the invention. Regulation system 40(*a*) interacts with flow control unit 20 that serves to control the flow of the gaseous or fluid substances to the consumer location 18. Flow control unit 20 may be placed in advance of gas meter 14, or may be combined with gas meter 14 as an integrated system. Such integration would simplify the entire mechanism and thus allow for the system to be manufactured less expensively. Another example is that flow control unit 20 may be triggered using a method other than the one employed in this embodiment.

Figure 2:
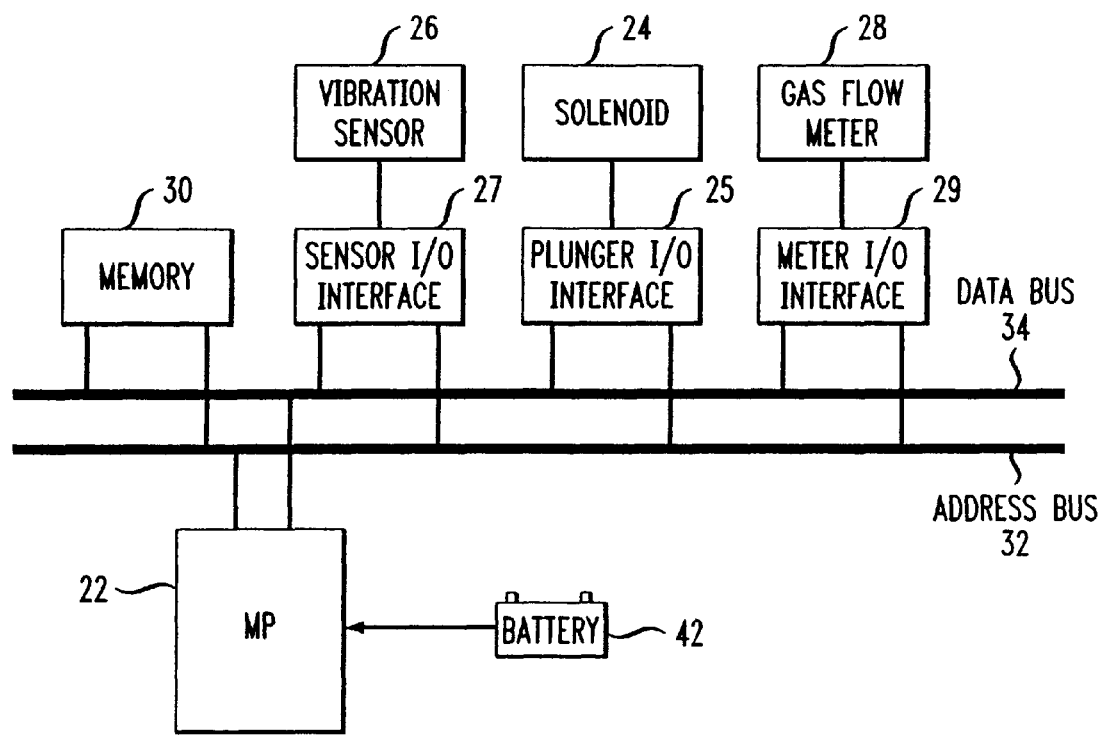
FIG. 2 is a block diagram of the electronic components of the shutoff system illustrated in FIG. 1.

Various components of the automatically actuated regulation system 40(a) include a vibration sensor 26, a flow meter 28, and a trigger unit 24. Each of these components is connected to a microprocessor 22 using an input/output interface unit able to convert mechanical signals into electrical signals (FIG. 2).

In the preferred embodiment, vibration sensor 26 consists of a solid state piezoresistive accelerometer mounted on a printed circuit board. Typically, accelerometers are available as single axis type units and dual axis type units. The difference between these units is the number of axes on which the accelerometer is capable of detecting vibrations. In the preferred embodiment, a dual axis type accelerometer is used. The use of accelerometers make it possible to adjust the threshold at which vibration sensor 26 provides a signal that signifies a vibration has occurred and may cause a rupture in the pipeline. An example of this is an accelerometer manufactured by EG&G IC Sensor, part number 3022, 3028, or 3031. Alternatively, vibration sensor 26 can be a small metal ball within a capsule, which makes or breaks a circuit when subject to sufficient vibration. An example of this is a motion switch manufactured by Durakool Switches, part number 20243.

Flow meter 28 is positioned to measure the flow within protected line 16. In the preferred embodiment, flow meter 28 is the consumer meter supplied by the local utility which has been modified. One modification might be a pulser 70 (shown in FIG. 1) which includes a reed switch 74 and cam 72 added to the meter face. As the dials of the meter move, cam 72 is moved and alternatively opens and closes reed switch 74 which in turn opens and closes a circuit creating a 'pulse'. This pulse is what microprocessor 22 uses to track the flow of the gas or fluid in the pipe. An example of a pulser is one manufactured by IMAC Systems, model number IMAC DMP. This pulser is offered at 10 pulses per revolution connected to the 'half foot' dial of the meter. Alternatively, a turbine type flow meter can be used that would be integrated into the complete system in one compact package without relying on a diaphragm type meter which is standard issue for the utility company. An example of a turbine type meter is the SZ turbine meters distributed by IMAC Systems. These meters are suitable for combustion gases and are highly accurate and sensitive.

In the preferred embodiment mentioned above, a gas meter supplied by the utility company is used in conjunction with a pulser 70 to determine gas flow. A main advantage of this system is that costs are greatly reduced relative to a system which uses a turbine type flow meter. It should be understood, however, that the use of pulser 70 in conjunction with a diaphragm meter may occasionally result in flow data that includes crude irregularities. Thus, it may be necessary to compensate for these irregularities. This is accomplished by utilizing an appropriate algorithm that is programmed into microprocessor 22 and adjusts for irregularities as they are encountered. Also, the use of ten pulses per revolution aids in providing more accurate data.

Another advantage of using pulser 70 in combination with the gas company supplied meter is the opportunity to carry out enhanced and telephonic metering. As described in more detail below, enhanced metering includes the retrieval of additional data from a consumer location not normally collected by a gas company. Telephonic metering allows the gas company to retrieve data from a consumer meter without the need for physically reading the meter at the consumer location. As most of the equipment required to carry out such functions is already in place, advanced and telephonic metering add only limited costs to the overall system.

Enhanced metering is made possible by microprocessor 22. In the preferred embodiment, microprocessor 22 is a relatively simple, programmable, microcontroller based, single board computer. For example, it has been determined that a suitable single board computer is the Intel 8051 microprocessor or a similar eight bit microcontroller based single board computer programmed in the computer language "C." However, as one in the art will appreciate, microprocessors such as the one described often become obsolete in a relatively short period of time. In turn, the invention is by no means limited to the incorporation of the aforementioned processor. It is also preferred that a modem 150 (shown in FIG. 6) module is coupled to microprocessor 22. Modem 150 allows for data to be transmitted to and from the gas company, obviating the need for a person to physically check the meter to determine customer usage. It should be understood by one skilled in the art that while modem 150 is the preferred external interface for transmission of data, any method—present or future—could be used to interconnect microprocessor 22 to another location. This includes but is not limited to, hardwiring, infrared communication via a meter reader at the premises, and radio transmission, e.g., cellular network, pager. Microprocessor 22 must be capable of storing data and running algorithms that are programmed into the device.

In depth customer usage profiling includes—but is not limited to—some of the following data groups. Most importantly, a simple hour-by-hour weekday and weekend usage data group is preferably stored in memory 30. Additionally, a record of hour-by-hour weekday and weekend peak usage may be stored. Also, maximum peak usage can be determined from the aforementioned values.

In order that space in memory 30 is conserved—or so that less overall memory can be used—storage preferably consists of twenty-four memory locations for hour-by-hour data sets. Instead of storing each hour's use during the week, the device stores data for a specific hour of the day in the same memory location. For instance, weekday usage from 10 am to 11 am is stored in the same location Monday through Friday. Each day, additional gas usage between these hours is added to the previous sum total of gas usage. From this data, an average usage can be determined for specific time periods during the week. For example, after twenty days, the average usage between the hours of 10 am and 11 am for each day could be determined by dividing the sum total of gas usage during these hours by twenty.

The data obtained from the meter can be used for its traditional purpose. Namely, determining total usage so that a utility company can bill a customer for consumption of gas. Besides using data sets for billing purposes, it is possible for the gas company to use the data to further profile customers by pattern recognition. Pattern recognition involves the analysis of usage data to approximately determine when a customer is using a specific appliance—such as a stove, clothes dryer, boiler, or water heater. While it is difficult to determine exactly what appliance the customer is using, pattern recognition makes it possible to determine with some degree of accuracy when a customer is using a specific appliance. It should be understood that this profiling is only made possible because of the large set of data that is collected. Such profiling is not available with customary gas metering systems.

Data storage also allows the gas meter to be used as a demand metering system. A demand metering system tracks peak usage and therefore allow higher rates to be charged when a predetermined threshold value is exceeded. Likewise, individual consumers may be charged at a higher rate for their natural gas upon exceeding a threshold value.

Figure 6:
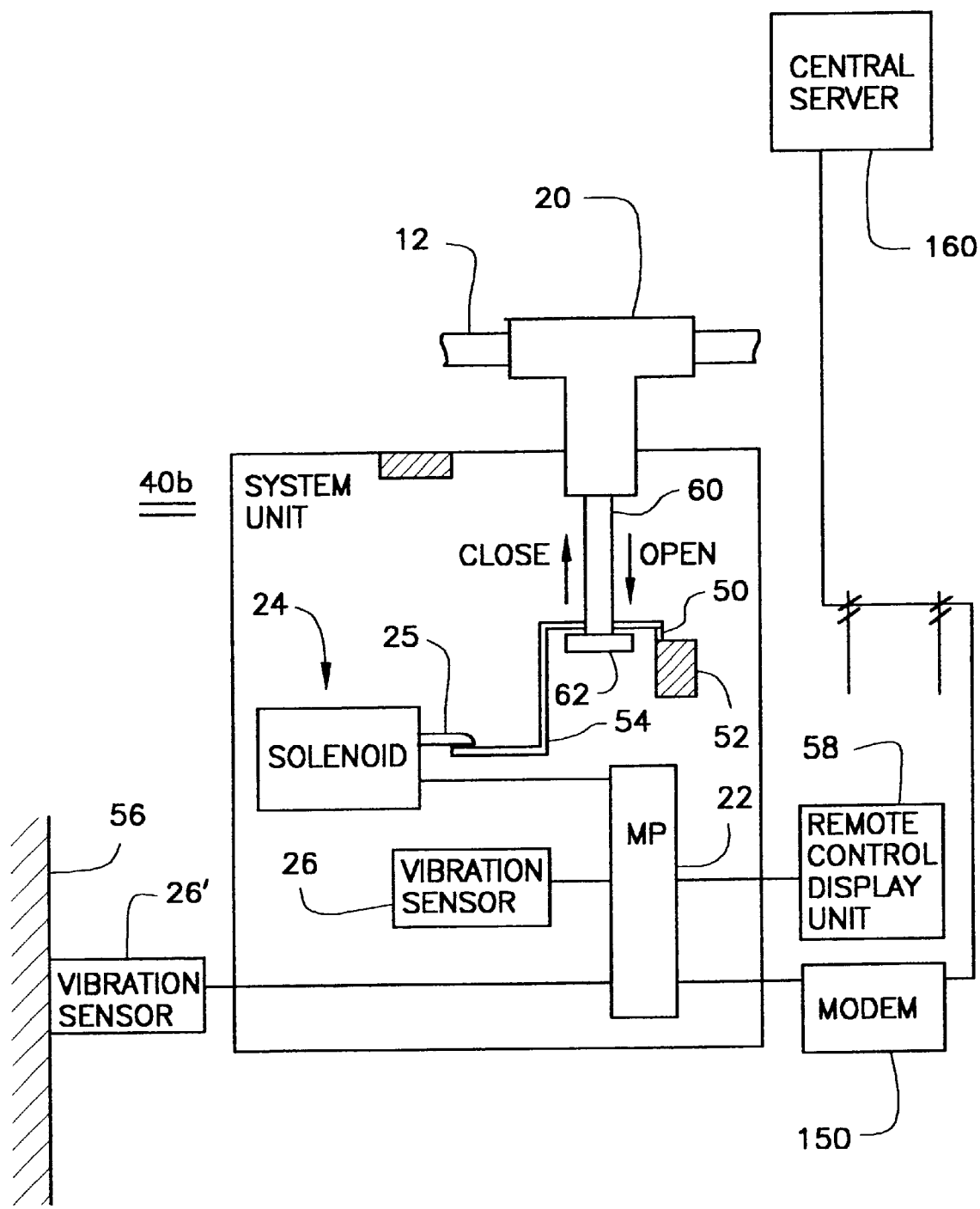
FIG. 6 is a block diagram of a valve shutoff system in accordance with another embodiment of the present invention.

With reference to FIG. 6, microprocessor 22 can be programmed to use modem 150 to communicate electronically with the utility company periodically, e.g., once a month, and upload data stored in its memory 30 to a central server 160 at the utility company or another location. The operation of central server 160 is described in more detail hereinafter with reference to the flow chart illustrated in FIG. 7.

Figure 7:
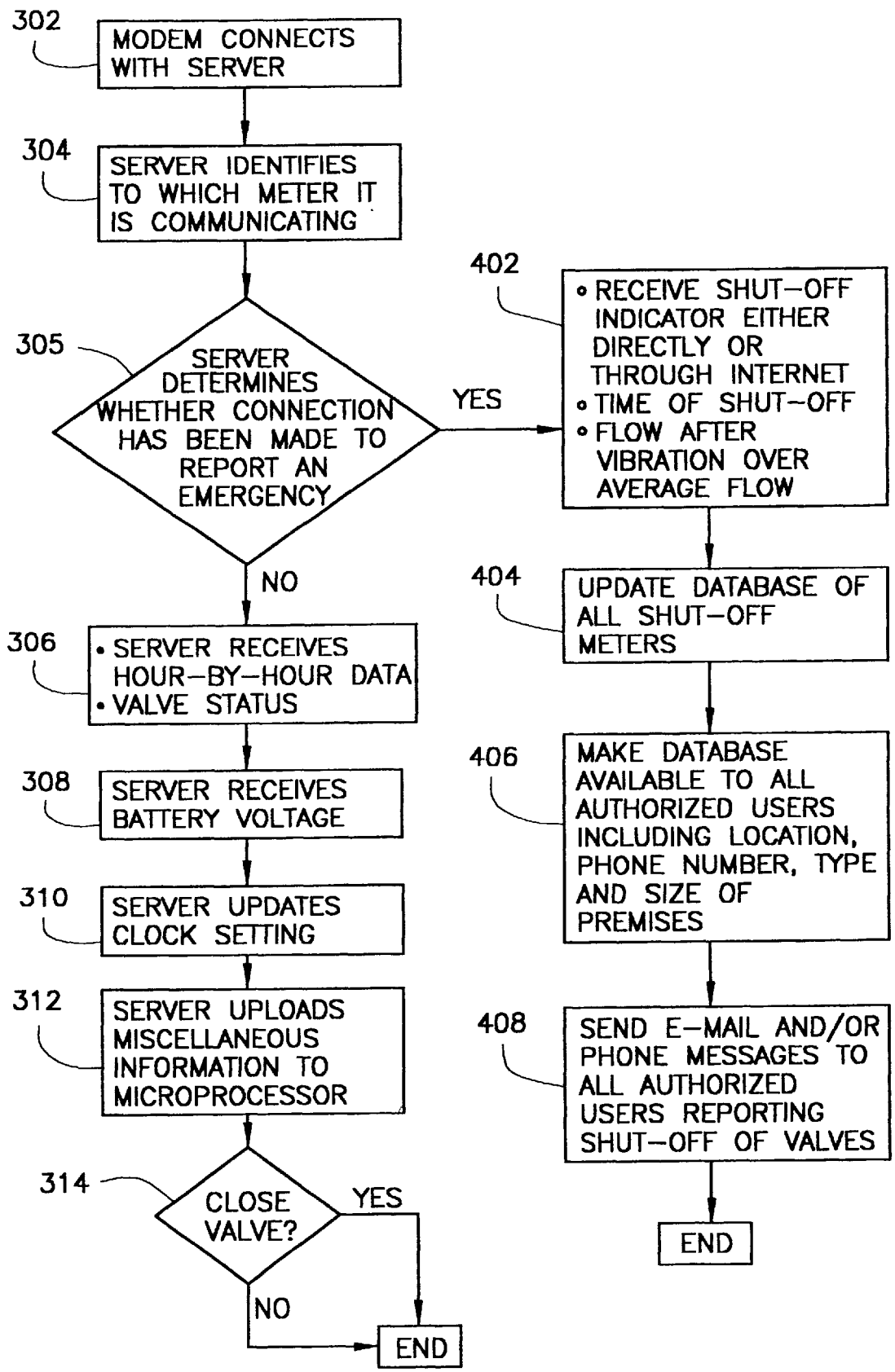
FIG. 7 is a flow chart of the steps carried out by the present invention when the system is connected to a central server.

Referring to FIG. 7, at step 302, central server 160 connects with modem 150 to send instruction signals to microprocessor 22 and receive pertinent information signals from microprocessor 22. It is possible that modem 150 will be unable to contact server 160 due server 160 being down, lines busy, phone line problems, or the like. In the preferred embodiment, modem 150 will make two additional attempts separated by five to ten minutes. If modem 150 is still unable to contact server 160, data will continue to accumulate and another three attempts will be made every twenty-four hours until a connection is established. It should be understood that the procedure for contacting server 160 in the event of difficulties is not limited in the aforementioned regard.

In the preferred embodiment, a nondedicated phone line is used. However, this may prevent server 160 from contacting modem 150. Thus, gas shutoff would occur upon periodic dial-up by modem 150. Even with a non-dedicated line, it may be possible for server 160 to contact modem 150. This is accomplished by having modem 150 always listen for modem tones when a call is connected. If a person or answering machine answers the phone, and modem tones are received, the speaking lines are disconnected and data can be exchanged between modem 150 and server 160. Otherwise, modem 150 will always answer the phone after fifteen rings. In an alternative embodiment, a dedicated line would be used allowing server 160 to dial-up modem 150 with none of the aforementioned procedures.

At step 304, microprocessor 22 transmits to server 160 the meter account number or other identifying number. At step 305, server 160 queries microprocessor 22 to determine whether server 160 has been contacted because of an emergency. If it is not an emergency, at step 306, the meter transmits all average hour-by-hour data accumulated for each day of the week since the last transmission and the maximum one time peak voltage usage. Also at step 306 the position of the valve, i.e., whether opened or closed, is reported to server 160. So that connection time can be minimized, a utility company may opt to only receive total monthly gas usage from a customer. As such, this value can be determined by microprocessor 22 and stored in memory 42 before connection to central server 160. After uploading usage data, at step 308, the voltage of backup battery 42 (discussed in detail below) is uploaded to the utility. In response to a lower than normal voltage, the utility company can have battery 42 inspected and replaced if necessary.

After data is received by central server 160, the meter begins to download information from server 160. In order to make certain that the meter unit is synchronized with the utility company's master clock, at step 310, server 160 transmits to the meter the correct time and day. If need be, meter time values are subsequently adjusted accordingly. At step 312, server 160 also provides an indication as to how many days until the meter should again transmit data to central server 160. Further specified is the time of day that the next transmission will commence. Also, peak usage values for the next period are provided if such values have changed. Alternatively, central server 160 may contact modem 150 if peak usage values change. A dial-up number for the next transmission is then furnished. At step 314 a determination is made as to whether the valve should be closed. Reasons for closing the valve are discussed in more detail below and may include an extended absence by the customer. After uploading and downloading is complete, the storage registers in memory 30 for the prior month are reset to zero and modem 150 disconnects from central server 160.

There is a disadvantage to not having a gas company employee read the customer gas meter every so often. This stems from the increased potential for customers to compromise meter values. After all, conventionally, when gas company employees take a reading from a customer gas meter, they typically check for gas meter boxes for tampering. This will not be the case when using telephonic metering capabilities. However, because the utility company can receive an hourly usage profile of the customer, a drastic change in usage may alert the utility company to possible tampering. In response, a utility company may wish to physically check the meter.

Server 160 can also be capable of contacting modem 150 to signal microprocessor 22 to close valve 36 as described above. This may allow a utility company to stop gas flow to a customer—if the need arises—without having to physically visit the customer location. For example, if a customer has failed to pay the utility for gas use, server 160 may automatically close the particular customer's valve. In one embodiment, in emergency situations, such as a fire, appropriate authorities may contact the utility company so that valves in the vicinity of the fire may be closed. Also, a customer may contact the utility requesting valve shut-off during an extended absence.

Modem 150 can also be used to transmit emergency data to the utility company. In one embodiment, upon detection of a ruptured pipe, microprocessor 22 automatically contacts the utility company and submits a report of the event. In turn, the utility company may provide access to pertinent data on server 160 to a plurality of authorized users. Such pertinent data may include valve shut off indication information, location of premises with shut off, type (residential or commercial) and size of premises. The authorized users may include emergency repair companies who can visit a premises to repair a potential rupture. Other users may include insurance companies who can analyze the extent of damages or potential explosion in the event of a natural disaster. The utility company may provide said information to authorized users upon payment of subscription fees providing an additional source of income.

As shown in FIG. 7, at step 305, if it is determined that server 160 has been contacted in an emergency situation, step 402 is carried out. At step 402, server 160 receives an indication that the valve has been shut-off. Additionally, server 160 is provided with the time of shut-off along with the flow after the vibration versus the average flow. At step 404 the database of server 160 is updated to reflect the shut-off of the valve. At step 406, the database is made available to all authorized users. The report of a valve shut-off includes the location, the phone number of the person responsible for the valve, and the type and size of the premises. At step 408 an e-mail, and if necessary a phone message, is delivered to all authorized users to report all shut-off valves.

In one embodiment, after a major earthquake, the data for a geographic location can be used to map the valves that were shut-off. This valuable information can be used by seismologists and other researchers. The information will complement other collected data such as seismographs, maps of faults, soil samples, physical damage, and evidence of earth liquefaction. In turn, the data collected by the utility will be useful in helping to predict where heavy damage might occur in future earthquakes.

In another embodiment, microprocessor 22 communicates solely with central server 160 to transmit emergency information or usage data. Central server 160 then utilizes the Internet in order to forward e-mail to appropriate entities. For example, such e-mails can include the locations of suspected pipe ruptures and may be sent to contractors. As another example, e-mails containing usage statistics may be sent to direct marketing companies interested in specific customer gas usage. Alternatively, for those not capable of receiving e-mail—or as a primary notification method—server 160 can be configured to deliver audio messages via a standard telephone. Also, detailed reports of customer usage may be forwarded to the appropriate entities by the United States Post Office or by other traditional means.

In another embodiment—again to limit the number of contacts the system must make using modem 150—central server 160 is connected to the Internet and is configured to function as a web site on the world wide web. As such, the site can be accessed by any person having the proper equipment—namely, a computer, a modem, and an Internet Service Provider that can connect the computer to the Internet. In this case, all customer information regarding usage and pipe rupture is stored on the site. The site is secured so that only authorized persons are able to gain access to confidential information on the site. Authorized persons may include those who have paid the utility company in order to gain access to the information. In one embodiment, data can be distributed according to the type of subscription obtained by the individual or business. As price of the service increases, the authorized person may obtain greater access to data. This may include, but is not limited to, wider geographic regions, more current data, and specific customer data.

If modem 150 is not used, or if it not possible to use modem 150 for one reason or another, a remote reader may be used to obtain a meter reading when access to the meter is restricted. A remote meter 152 is hardwired to terminals that are inside the meter unit and connected to microprocessor 22. Preferably, as stated previously, pulser 70 provides ten pulses per revolution for increased accuracy. However, commercially available remote readers are programmed for pulsers 70 that pulse once for each revolution. In this instance, an algorithm is programmed into microprocessor 22 to provide one pulse for every ten pulses.

In the preferred embodiment, trigger unit 24 is a solenoid that includes a solenoid plunger 25. Trigger unit 24 is capable of activating flow control unit 20. In this embodiment, valve stem 36 has a protruding lip or a recessed surface on it so that when solenoid plunger 25 is extended, it will engage valve stem 36 keeping the valve in an open position. Conversely, when trigger unit 24 is actuated, solenoid plunger 25 disengages from a spring loaded valve stem 36 of a valve (flow control unit 20) allowing the valve stem to spring to a closed position. An advantage of using a solenoid is that it does not require power while remaining in an untriggered position. Instead, a brief pulse of current will cause the solenoid plunger to retract and release the spring loaded valve stem 36.

Alternatively, trigger unit 24 can be combined with the flow control unit 20 into one integrated package which should reduce the cost and size of the unit. If not combined, flow control unit 20 can be triggered by other methods besides solenoids. This includes but is not limited to magnetic, pneumatic or hydraulic, coupled actuation. Ideally, no power should be exerted to hold the valve open and a brief pulse should be all that is needed to actuate flow control unit 20. Low power consumption is desirable when there is an earthquake of moderate or severe magnitude since there will most likely be a power interruption due to downed power lines. This leaves internal backup battery supply 42 to supply power to run vibration sensor 26, flow sensor 28, microprocessor 22, and when necessary, actuate flow control unit 20.

System unit 40(a) is powered using AC power 41 which is backed-up by battery supply 42. Unit 40(a) includes indicator lights 44 which provide a status update to the user. These lights may include, but are not limited to: AC power on/off, vibration sensor triggered, system alert, flow of gas detected, ruptured pipe detected, and battery weak. The system also includes an audible alarm 46 which sounds when a ruptured pipe is detected, battery 42 is weak, or the electrical line between flow meter 28 and microprocessor 22 is severed (in the preferred embodiment, if this line is severed, microprocessor 22 will stop the flow of gas). A user can control system unit 40(a) through buttons 48. These buttons may include, but are not limited to, emergency shutdown (an additional way to shut off the gas in the event of an non-earthquake emergency such as a fire) and electronic reset.

During operation, natural gas enters the system through supply line 12 passing through gas meter 14 which determines the amount of gas consumed by the customer. The gas continues through supply line 12, passing through flow control unit 20 (when flow control unit 20 allows for the flow of natural gas). In the preferred embodiment, flow control unit 20 is a Red-Hat® Solenoid Valve for Combustion Systems (#HV216-585) (The valve can be found in ASCO® Catalog 102a, p.7.) After flow control unit 20, the gas enters and passes through protected line 16 and then into customer location 18.

Referring to FIG. 2, a block diagram is provided of microprocessor 22 and the components connected to microprocessor 22. Vibration sensor 26, trigger unit 24, gas flow meter 28, and, in one embodiment, memory 30, are coupled to the microprocessor 22 via I/O interface units 27, 25, and 29, respectively. The components and microprocessor 22 communicate through the use of data and address buses 34 and 32. Vibration sensor 26 provides vibration signals that have a magnitude corresponding to the level of seismic activity in the vicinity of the system.

Alternatively, vibration sensor 26 may provide a signal to microprocessor 22 when a vibration amplitude exceeds a predetermined value. The predetermined value can vary from application to application based on the type of structure, foundation, land the structure is on (soil, sand, rock, etc.), water table level, age of structure, and degree of earthquake building code preparedness. For example, the office of the Division of the State Architect of the State of California has determined a set of standards known as Part 12, Title 24: Engineering Regulation-Quality and Design of the Materials of Construction. Standard number 12-23-1 is titled California Standard for Earthquake Actuated Automatic Gas Shutoff Systems. It states that the sensing means of the valve or system shall actuate the shutoff means within 5 seconds when subjected to a horizontal, sinusoidal oscillation having a peak acceleration of 0.3 g and a period of vibration of 0.4 second. The sensing means of a valve or system shall not actuate the shutoff means when subjected for 5 seconds to horizontal, sinusoidal oscillations having:

1. A peak acceleration of 0.4 g with a period of vibration of 0.1 seconds;
2. A peak acceleration of 0.08 g with a period of vibration of 0.4 seconds and;
3. A peak acceleration of 0.08 g with a period of vibration of 1.0 seconds.

Gas flow meter 28 provides a gas flow signal to meter I/O 29. Microprocessor 22 preferably monitors the gas flow signal and calculates a corresponding average signal over a predetermined period as specified by the user. Trigger unit 24 is configured to be triggered by microprocessor 22 via plunger I/O interface 23. Thus when microprocessor 22 is directed to activate trigger unit 24, it generates a control trigger signal to trigger unit 24. In response to this trigger signal, trigger unit 24 activates flow control unit 20 which disrupts the flow of gas in pipeline 16. Memory 30, which may be integrated into microprocessor 22 itself, is capable of storing information such as predetermined vibration levels and average flow data.

The flow data consists of a number of pulses within a specified time-frame—usually one minute. In a typical residential diaphragm type gas meter which is supplied by a utility company, the pulse count can range from zero to approximately ten depending on the meter rating and the load. When vibration sensor 26 is triggered, microprocessor 22 monitors the flow meter 28 for a specified period of time. If after that time, no increase in flow is detected, trigger unit 24 will not be activated. The time frame is typically one minute though other times are possible. This time frame gives the average structure one minute to collapse from the end of the last vibration. If the structure doesn't fail within one minute, the chances are it won't fail and the microprocessor 22 resets. Thus, after receiving data from vibration sensor 26 or gas flow meter 28, microprocessor 22 is able to compare results stored in memory 30.

Figure 3:
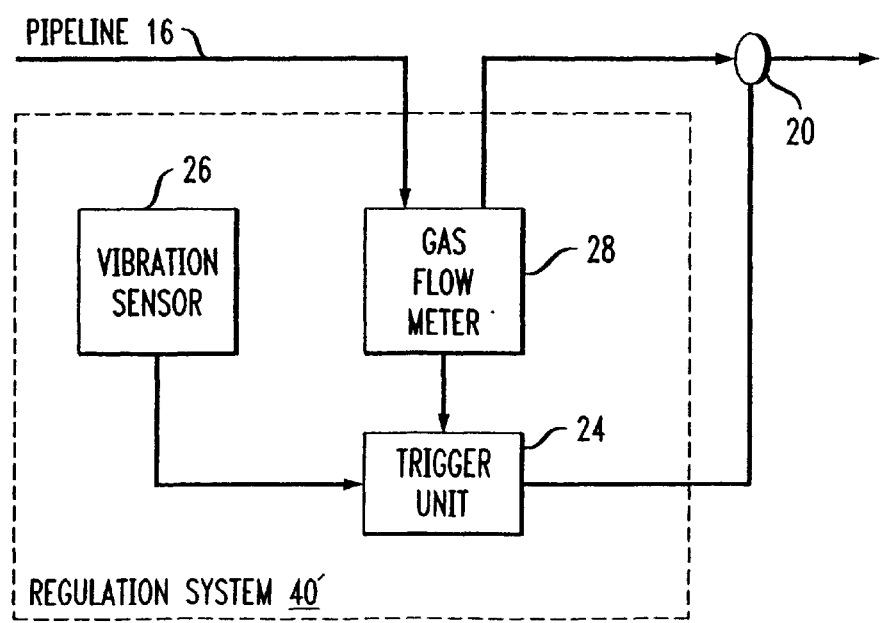
FIG. 3 is a block diagram of the system in accordance with another embodiment of the invention.

FIG. 3 illustrates a block diagram of a regulation system, such as 40(a)' in accordance with another embodiment of the invention, although the invention is not limited in scope in that respect. Vibration sensor 26 is coupled to a trigger unit 24, and is configured to provide vibration sensing signals to an input port of the trigger unit. Similarly, gas flow meter 28 is configured to measure the flow of gas traveling in pipeline 16 and provide a corresponding flow signal to another input port of trigger unit 24. An output port of trigger unit 24 is coupled to an input port of a flow control unit 20, which is disposed along the flow of gas to control this flow traveling in pipeline 16.

In accordance with one embodiment of the invention trigger unit 24 is configured to interpret signals from sensor 26 and meter 28. Trigger unit may include logic circuitry to generate a trigger signal to control unit 20 when vibration sensor 26 generates a vibration signal that is above a predetermined vibration threshold level, and when the flow of gas as measured by gas flow meter 28 is above a predetermined threshold level as well. In accordance with one embodiment of the invention, the gas flow threshold level may be set to the gas flow prior to the generation of the vibration signal above a vibration threshold level. It is noted that trigger unit 24 may be employed in either hardware or software arrangement or both, in accordance with one embodiment of the invention.

Figure 5:
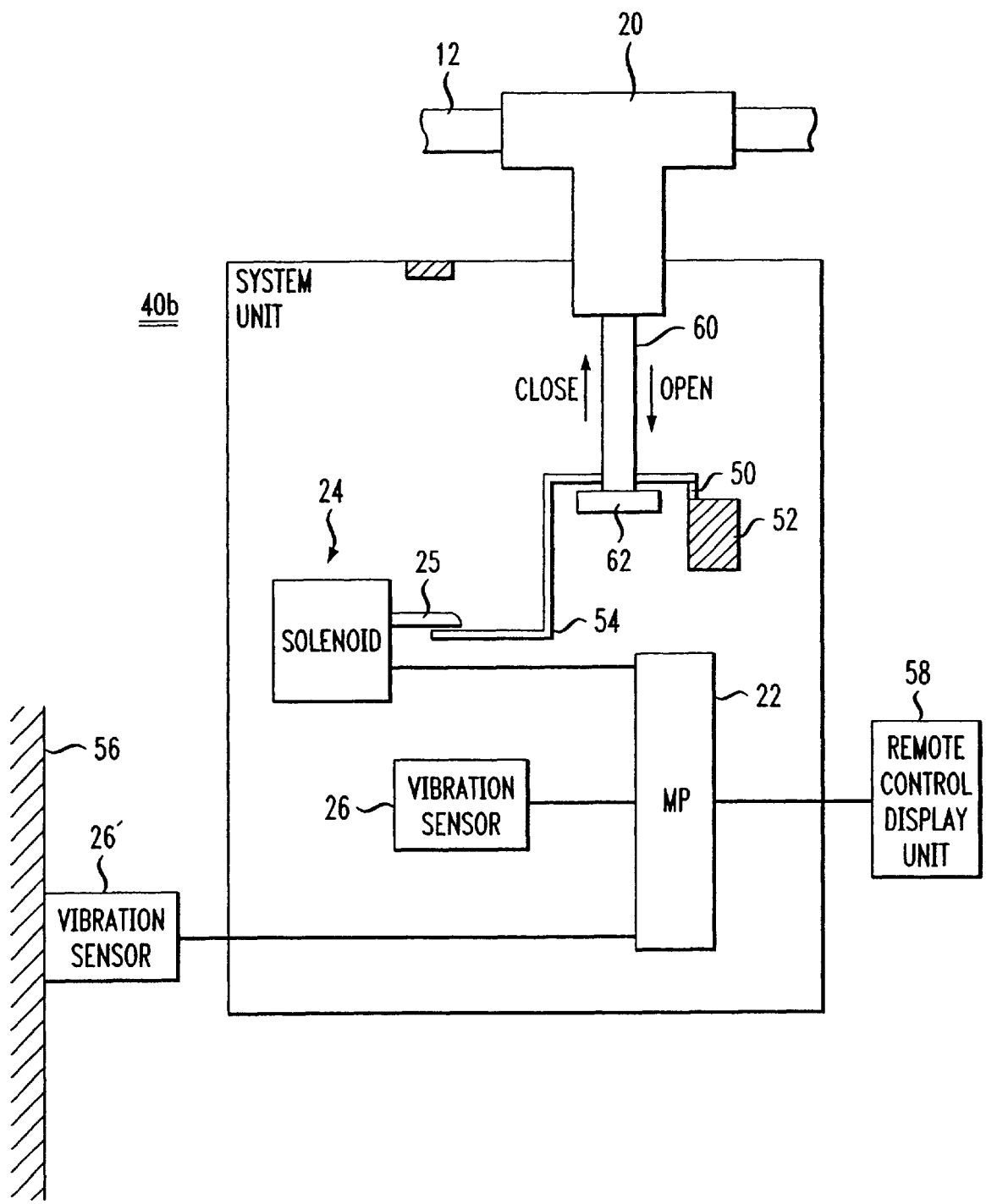
FIG. 5 is a block diagram of a valve shutoff system in accordance with another embodiment of the present invention.

FIG. 5 is a block diagram of an automatically actuated flow regulation system 40(b) in accordance with another embodiment of the invention. As illustrated system 40(b) includes an on-board vibration sensor 26 and a remote vibration sensor 26'. Vibration sensor 26' is advantageously disposed at a remote location such as the foundation wall 56.

Alternatively, if the consumer unit does not have a basement and is built on a slab, vibration sensor 26' may be anchored onto the floor. By removing the vibration sensor from the main unit, the system substantially avoids false triggers. This follows because, non-earthquake causes of vibration, such as trucks rolling by, or airplanes flying over, may trigger the vibration sensors by causing the pipes to which the main unit is attached to vibrate. Typically, the pipes to which the sensor unit is attached vibrate more readily than other structures at the consumer unit, such as the foundation wall or floor surfaces.

System unit 40(b) is also coupled to a remote control display unit 58. Remote control display unit 58 may be located near an exit door or other locations that may be easily accessed by the consumer in the event of an emergency. In the event of fire or other types of emergency, requiring the shut down of the gas flow, a control button at remote control display unit may be pressed to provide a shutoff instruction signal to microprocessor 22 as illustrated in FIG. 5. In another embodiment—without the need for pressing a manual shutdown button—auxiliary inputs may be provided so that gas flow is automatically shut down for reasons other than a pipe rupture. For example, signals may be received from fire alarm systems, fire suppression systems, gas sniffers, and carbon monoxide sensors. Remote control display unit 58 preferably displays other control elements such as LED's or LCD's that indicate the status of the operation of system unit 40(b).

System unit 40(b) also includes a spring loaded valve stem 60 that has a base 62, which engages a release arm 54, which is hinged at one end to an anchor 52 vi a hinge 50. The other end of release arm 54 is biased downwardly by a solenoid plunger 25 so as to pull valve stem 60 down by exerting force on base 62. As illustrated, when valve stem 60 is biased downwardly valve 20 remains open. When it is desired to close valve stem 20, solenoid 24 is energized so as to pull plunger 25 in, causing the release of arm 54. As a result arm 54 swings up, which in turn allows valve stem 60 to rise and thus, close valve 12. In order to reset trigger unit 24, release arm 54 is pulled down causing plunger 25 to retract again. Once arm 54 moves sufficiently down, plunger 25 is extended again to bias arm 54 downwardly so that it holds valve stem 60 in open position. Preferably, release arm 54 is made of aluminum which is strong and relatively light.

Figure 4:
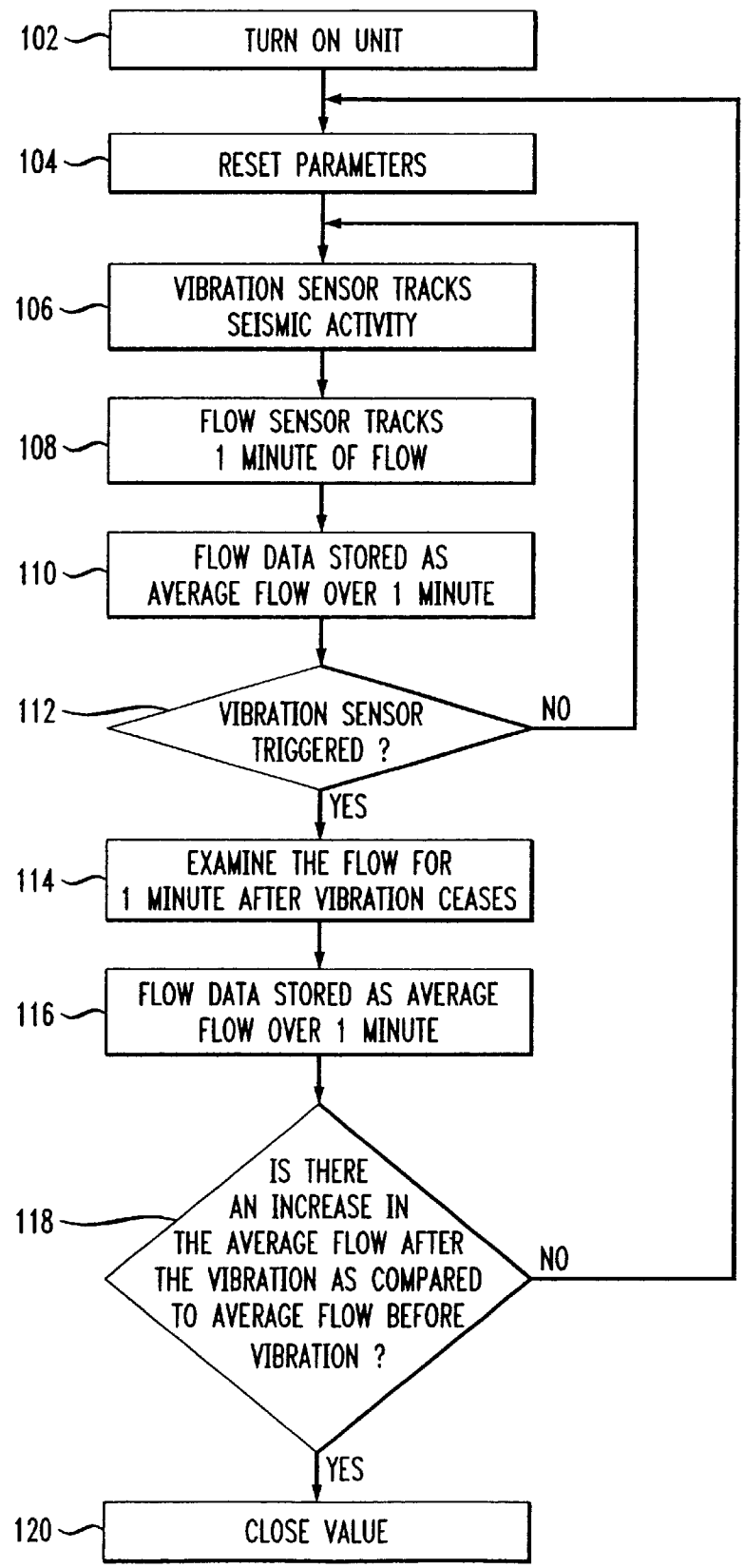
FIG. 4 is a flow chart of the steps carried out by the present system.

Referring now to FIG. 4, a flow chart depicts the steps carried out by system unit 40(a). At step 102 unit 40(a) is turned on either by AC power 41 or by the battery backup 42. At step 104, microprocessor 22 resets the parameters of microprocessor 22. For example, one parameter would likely be average flow registers. At step 106, microprocessor 22 monitors vibration sensor 26 to determine whether there is a high vibration. At the same time, at step 108, microprocessor 22 keeps track of the flow of gas based on a flow signal provided by gas flow meter 28. At step 110, the data collected in step 4 are stored in memory 30 as an average flow over one minute. Step 112 is a decision point in which microprocessor 22 determines whether a predetermined level of vibration has occurred. If such a vibration has not occurred, microprocessor 22 returns to step 106. If such a vibration has occurred, microprocessor 22 moves to step 114. At step 114, microprocessor 22 reexamines the average flow of gas for one minute after the vibration occurred. At step 116, as in step 110, flow rate data is stored in memory 30 as an average flow. At step 118, microprocessor 22 compares the flow rate before and a period of time after the vibration. If there is no such change in flow, microprocessor 22 returns to step 104. Alternatively, if the average flow rate is higher than the average flow rate before the vibration, microprocessor 22 moves to step 120. At step 120 the valve is closed.

It is noted that the specified period of time to measure the flow rate after the occurrence of a vibration can be varied depending on system design specifications. For example, the one minute period to measure the flow rate after the occurrence of a vibration may be reduced or enlarged to other desired time periods.

It is also noted that in accordance with another embodiment of the invention, the pre-vibration flow rate is stored even after the system is reset at step 104 after the determination made at step 118 that no increase of flow has been indicated after a vibration. When the system is reset at step 104, it takes a certain period of time, for example, 60 seconds to establish a new average flow rate. If a vibration occurs during this sixty seconds time period, the system employs the pre-vibration flow rate to compare it with the flow rate after the occurrence of the second vibration. The pre-vibration flow rate remains in memory 30 for the same period of time that it is necessary to establish a new average flow rate: sixty seconds for the present example. This arrangement prevents the valve to close in the event an after shock occurs before a new flow rate is established after a first vibration.

Thus, the present invention is an arrangement which provides a relatively simple, cost-effective system, which can reliably detect rupture of natural gas pipelines due to earthquake vibration. This system is reliable because of the two steps used in determining whether or not flow control unit 20 should be closed. The initial trigger is a predetermined vibration amplitude. After a vibration, microprocessor 22 determines whether or not there is an increase in the flow of gas through protected line 16. Such an increase in flow will often mean that pipeline 16 has ruptured. Only then will microprocessor 22 close flow control unit 20.

It should be noted this system has been specifically designed for natural gas pipelines. However, it is possible that such a system can be used with gas pipelines of any kind. Also, it is feasible that such a system may be used with pipelines which carry liquid.

While only certain features of the invention have been illustrated and described herein, many modifications, substitutions, changes or equivalents will now occur to those skilled in the art. It is therefore to be understood that the appended claims are intended to cover all such modifications and changes that fall within the true spirit of the invention.

What is claimed is:

1. An automatically actuated regulation system for gas and other fluids flowing in a pipeline comprising:
   a microprocessor configured to control said regulation system;
   a flow control unit coupled to said microprocessor, said flow control unit configured to regulate the flow through said pipeline when activated;
   a vibration sensor coupled to said microprocessor, said sensor configured to determine seismic activity of the earth in the vicinity of said system, and generate a vibration indication signal corresponding to the amplitude of said seismic activity;
   a mechanical gas flow meter configured to provide a mechanical indication of the measure of gas flow through said pipeline;
   a conversion means converting said mechanical indication to an electrical output signal, said means coupled to said microprocessor;
   a trigger unit, said trigger unit coupled to said flow control unit and configured to activate said flow control unit; and
   said trigger unit activating said flow control unit when
      said vibration indication signal is larger than a first predetermined threshold value, and
      said measure of flow signal is larger than a second threshold value.

2. The system in accordance with claim 1, wherein said automatically actuated regulation system for gas and other fluids flowing in a pipeline further comprises a modem coupled to said microprocessor, said modem configured to transmit and receive data over a communication line.

3. The system in accordance with claim 1, wherein said second threshold value is the average value of said flow signal over a predetermined time period.

4. The system in accordance with claim 1, wherein said flow control unit is a spring-loaded valve.

5. The system in accordance with claim 4, wherein said trigger unit is a solenoid having a solenoid plunger.

6. The system in accordance with claim 1, wherein said system is equipped to provide a status update through a group of illuminated indicators.

7. The system in accordance with claim 6, wherein said group of illuminated indicators indicate presence of said vibration indication signal, said flow signal, and a rupture of said pipeline.

8. The system in accordance with claim 1, wherein said system is equipped to provide a status update through an audible alarm.

9. The system in accordance with claim 8, wherein said audible alarm indicates presence of a rupture in said pipeline or the disruption of said flow signal from said gas flow meter to said microprocessor.

10. The system in accordance with claim 1, wherein said system is configured to receive a plurality of mechanical inputs.

11. The system in accordance with claim 10, wherein said plurality of mechanical inputs result in activation of said flow control unit and reset of parameters stored by said microprocessor.

12. The system in accordance with claim 1, wherein said system is powered by an uninterruptable power supply comprising an AC power supply and a back-up battery supply, said back-up battery providing power when said AC power supply fails.

13. The system in accordance with claim 1, further comprising a housing for containing said microprocessor, wherein said flow control unit couples said housing to said pipeline.

14. The system in accordance with claim 13, wherein said vibration sensor is located remotely from said housing.

15. The system in accordance with claim 5, wherein said trigger unit comprises:
   a release arm having one hinged end and one free end, wherein said free end is retained by said solenoid plunger so as to bias said flow control unit in a closed position.

16. An automatically actuated regulation system for gas and other fluids flowing in a pipeline comprising:
   a microprocessor configured to control said regulation system;
   a memory unit coupled to said microprocessor, said memory unit configured to store data;
   a flow control unit coupled to said microprocessor, said flow control unit configured to regulate the flow through said pipeline when activated;

a vibration sensor coupled to said microprocessor, said sensor configured to determine seismic activity of the earth in the vicinity of said system, and generate a vibration indication signal corresponding to the amplitude of said seismic activity;

a mechanical gas flow meter configured to provide a mechanical indication of the measure of gas flow through said pipeline coupled to a means for converting said mechanical a conversion means converting said mechanical indication to an electrical output signal, said means coupled to said microprocessor;

a trigger unit, said trigger unit coupled to said flow control unit and configured to activate said flow control unit;

a modem coupled to said microprocessor, said modem configured to transmit and receive data over a communication line; and said trigger unit activating said flow control unit when
said vibration indication signal is larger than a first predetermined threshold value, and
said measure of flow signal is larger than a second threshold value.

17. The system according to claim 16, wherein said data said modem is capable of transmitting is an indication specifying an identity of the system, a flow history stored by said memory unit, and a battery voltage value.

18. A central server configured to communicate with an automatically actuated regulation system for gas and other fluids flowing through a pipeline, said regulation system comprising:

a microprocessor configured to control said regulation system;

a flow control unit coupled to said microprocessor, said flow control unit configured to regulate the flow through said pipeline when activated;

a vibration sensor coupled to said microprocessor, said sensor configured to determine seismic activity of the earth in the vicinity of said system, and generate a vibration indication signal corresponding to the amplitude of said seismic activity;

a mechanical gas flow meter configured to provide a mechanical indication of the measure of gas flow through said pipeline coupled to a means for converting said mechanical a conversion means converting said mechanical indication to an electrical output signal, said means coupled to said microprocessor;

a trigger unit, said trigger unit coupled to said flow control unit and configured to activate said flow control unit;

a modem coupled to said microprocessor, said modem configured to transmit and receive data from said server over a communication line;

said trigger unit activating said flow control unit when
said vibration indication signal is larger than a first predetermined threshold value, and said measure of flow signal is larger than a second threshold value.

19. The central server according to claim 18, wherein said central server is configured to store data in a database, said data consisting of predetermined variables transmitted by said modem to said server.

* * * * *